United States Patent
Abe et al.

(10) Patent No.: US 9,856,342 B2
(45) Date of Patent: Jan. 2, 2018

(54) COPOLYMER AND MOLDED BODY

(71) Applicant: KURARAY CO., LTD., Kurashiki-shi (JP)

(72) Inventors: Toru Abe, Tainai (JP); Atsuhiro Nakahara, Tainai (JP); Hiroyuki Konishi, Tainai (JP); Hiroshi Ozawa, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 198 days.

(21) Appl. No.: 14/768,569

(22) PCT Filed: Dec. 27, 2013

(86) PCT No.: PCT/JP2013/007696
§ 371 (c)(1),
(2) Date: Aug. 18, 2015

(87) PCT Pub. No.: WO2014/125555
PCT Pub. Date: Aug. 21, 2014

(65) Prior Publication Data
US 2016/0002380 A1    Jan. 7, 2016

(30) Foreign Application Priority Data
Feb. 18, 2013   (JP) ................... 2013-029066
Jul. 3, 2013    (JP) ................... 2013-140219

(51) Int. Cl.
| | | |
|---|---|---|
| *C08F 220/68* | (2006.01) | |
| *C08F 212/08* | (2006.01) | |
| *C08F 220/10* | (2006.01) | |
| *C08F 230/02* | (2006.01) | |
| *C08F 220/14* | (2006.01) | |

(52) U.S. Cl.
CPC .......... *C08F 220/68* (2013.01); *C08F 212/08* (2013.01); *C08F 220/10* (2013.01); *C08F 220/14* (2013.01); *C08F 230/02* (2013.01)

(58) Field of Classification Search
CPC .... C08F 212/08; C08F 220/10; C08F 220/14; C08F 220/68; C08F 230/02
USPC ........................................................ 526/274
See application file for complete search history.

(56) References Cited

U.S. PATENT DOCUMENTS

2013/0001483 A1* 1/2013 Lee ................. G03F 7/033
                                                     252/586
2013/0296473 A1 11/2013 Chung et al.

FOREIGN PATENT DOCUMENTS

| CN | 103073963 | 5/2013 |
|---|---|---|
| DE | 40 05 377 A1 | 8/1991 |
| EP | 1 479 746 | 11/2004 |
| JP | 59 41349 | 3/1984 |
| JP | 61 141759 | 6/1986 |
| JP | 9 169882 | 6/1997 |
| JP | 9 302191 | 11/1997 |
| JP | 10 77308 | 3/1998 |
| JP | 2003 137915 | 5/2003 |
| WO | 2012 081761 | 6/2012 |

OTHER PUBLICATIONS

Supplementary European Search Report dated Jun. 6, 2016 in Patent Application No. EP 13 87 5306.
Ebdon, J. R., et al., "Thermal degradation and flame retardance in copolymers of methyl methacrylate with diethyl(methacryloyloxymethyl)phosphonate", Polymer Degradation and Stability, vol. 70, (2000), pp. 425-436.
Price, D., et al., "Flame retarding poly(methyl methacrylate) with phosphorus-containing compounds: comparison of an additive with a reactive approach", Polymer Degradation and Stability, vol. 74, (2001), pp. 441-447.
Reghunadhan Nair, C.P., et al., "Copolymerization of Diethyl 2-(Methacryloyloxy) Ethyl Phosphate with Alkyl Acrylates: Reactivity Ratios and Glass Transition Temperatures", Journal of Polymer Science: Part A: Polymer Chemistry, vol. 26, (1988), pp. 1791-1807.
Price, D., et al., "Flame retardance of poly(methyl methacrylate) modified with phosphorus-containing compounds", Polymer Degradation and Stability, vol. 77, (2002), pp. 227-233.
Hu, Y., et al., "Anionic Polymerization of MMA and Renewable Methylene Butyrolactones by Resorbable Potassium Salts", Journal of Polymer Science Part A: Polymer Chemistry, vol. 49, (2011), pp. 2008-2017.
International Search Report dated Mar. 25, 2014 in PCT/JP2013/007696 Filed Dec. 27, 2013.

* cited by examiner

Primary Examiner — Ling Choi
Assistant Examiner — Chun-Cheng Wang
(74) Attorney, Agent, or Firm — Oblon, McClelland, Maier & Neustadt, L.L.P.

(57) ABSTRACT

A copolymer comprising a structural unit (I) derived from a phosphonate monomer (1) such as diethyl methacryloyloxymethyl phosphonate, diethyl 2-methacryloyloxyethyl phosphonate and the like, and a structural unit (II) derived from a radical polymerizable monomer (2) such as methacrylic acid, acrylic acid, 8-tricyclo[5.2.1.0$^{2,6}$]decanyl methacrylate, t-butyl methacrylate and the like, wherein the content of phosphorus atoms from the phosphonate monomer (1) is 2.0 to 6.0% by mass relative to the mass of the copolymer. A formed article comprising the copolymer.

20 Claims, No Drawings

COPOLYMER AND MOLDED BODY

TECHNICAL FIELD

The present invention relates to a copolymer having excellent transparency and fire retardancy as well as a high glass transition temperature, and also relates to a formed article comprising the above copolymer.

BACKGROUND ART

A resin having excellent transparency is used for applications such as optical materials, illumination materials, signboards and decoration members. Fire retardancy may be required for these applications.

As a method for improving fire retardancy of a resin, known is a resin composition in which an inorganic compound such as basic magnesium carbonate is compounded in a resin (for example, refer to Patent Document 1). However, the above resin composition may not be suitable for use in a material which requires high transparency, such as optical materials because it usually has low transparency.

As other methods for improving fire retardancy, known are resin compositions comprising phosphoric acid ester or halogen-containing condensed phosphoric acid ester (for example, see Patent Documents 2, 3 and 4). However, phosphoric acid ester or halogen-containing condensed phosphoric acid ester comprised in these resin compositions may bleed on a surface during the course of usage to cause surface whitening and reduced fire retardancy. Further, resin compositions comprising halogen-containing condensed phosphoric acid ester have a risk of generating a halogen gas upon combustion, the halogen gas is toxic and metal-corrosive substance.

Further, proposed are copolymers in which phosphonate monomers or phosphate monomers are copolymerized with alkyl (meth)acrylate ester (see Patent Documents 5 and 6, Non-patent Documents 1 and 2). However, in order to improve the fire retardancy of these copolymers, the copolymerization ratio of phosphonate monomers or phosphate monomers needs to be increased. Since this results in a decreased glass transition temperature of a copolymer to be obtained, the copolymer will not be suitable for use at high temperature.

CITATION LIST

Patent Literatures

Patent Document 1: JP S61-141759 A
Patent Document 2: JP S59-41349 A
Patent Document 3: JP H09-302191 A
Patent Document 4: JP H09-169882 A
Patent Document 5: JP H10-77308 A
Patent Document 6: JP 2003-137915 A

Non-Patent Literatures

Non-patent Document 1: Polymer Degradation and Stability, Vol. 70, 2000, p 425-436.
Non-patent Document 2: Polymer Degradation and Stability, Vol. 74, 2001, p 441-447.
Non-patent Document 3: Journal of Polymer Science: Part A: Polymer Chemistry, 1988, Vol. 26, p 1791-1807.
Non-patent Document 4: Polymer Degradation and Stability, 2002, Vol. 77, p 227-233.
Non-patent Document 5: Journal of Polymer Science Part A: Polymer Chemistry, 2011, Vol. 49, 2008-2017

SUMMARY OF THE INVENTION

Problems to be Resolved by the Invention

An object of the present invention is to provide a copolymer having excellent transparency and fire retardancy as well as a high glass transition temperature.

Means for Solving the Problems

After conducting extensive studies in order to achieve the above object, the present invention which includes the following aspects has been completed.

[1] A copolymer comprising a structural unit (I) derived from a phosphonate monomer represented by formula (1) and
a structural unit (II) derived from at least one radical polymerizable monomer (2) selected from the group consisting of methacrylic acid, acrylic acid, a radical polymerizable monomer represented by formula (2a), a radical polymerizable monomer represented by formula (2b) and a radical polymerizable monomer represented by formula (2c),
wherein the content of phosphorus atoms from the phosphonate monomer represented by the formula (1) is 2.0 to 6.0% by mass relative to the mass of the copolymer.

[Formula (1)]

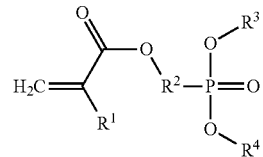

(1)

In the formula (1), $R^1$ represents a hydrogen atom or a methyl group; $R^2$ represents an alkylene group having 1-4 carbon atoms; and $R^3$ and $R^4$ each independently represent a hydrogen atom or an alkyl group having 1 to 10 carbon atoms.

[Formula (2a)]

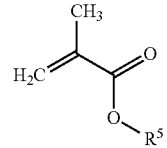

(2a)

In the formula (2a), $R^5$ represents a polycyclic aliphatic hydrocarbon group or an alkyl substituted monocyclic aliphatic hydrocarbon group.

[Formula (2b)]

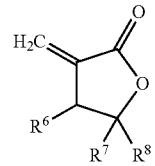

(2b)

In the formula (2b), $R^6$ and $R^7$ each independently represent a hydrogen atom or an alkyl group having 1 to 10 carbon atoms; and $R^8$ represents an alkyl group having 1 to 10 carbon atoms.

[Formula (2c)]

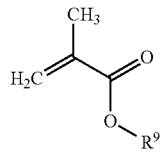

(2c)

In the formula (2c), $R^9$ represents —$CH_2CHR^{10}R^{11}$, —$CHR^{10}$—$CHR^{11}R^{12}$ or —$CR^{10}R^{11}R^{13}$; $R^{10}$, $R^{11}$ and $R^{13}$ each independently represent an alkyl group having 1 to 3 carbon atoms; and $R^{12}$ represents a hydrogen atom or an alkyl group having 1 to 3 carbon atoms.

[2] The copolymer according to [1], wherein the amount of the structural unit (II) is 5 to 60% by mass relative to the total mass of the structural units.

[3] The copolymer according to [1] or [2], wherein the $R^5$ is a norbornyl group, an isobornyl group, a tricyclodecanyl group, a dicyclopentadienyl group, an adamanthyl group, or a 4-t-butylcyclohexyl group.

[4] A formed article comprising the copolymer according to any one of [1] to [3].

Advantageous Effects of the Invention

The copolymer and formed article according to the present invention can also be used in a field where thermal resistance is required because they have excellent transparency and fire retardancy as well as a high glass transition temperature. The copolymer and formed article according to the present invention is particularly larger than a polymer comprising a phosphonate monomer (1) only in the amount of carbonized product (char) generated upon combustion. Char can suppress heat transfer and the diffusion of a combustion gas to increase a fire-retardant effect. An increase in the amount of carbonized product (char) produced is presumably due to a synergistic effect from combined use of the phosphonate monomer (1) and the radical polymerizable monomer (2).

EMBODIMENTS FOR CARRYING OUT THE INVENTION

The copolymer according to the present invention comprises a structural unit (I) and a structural unit (II).

The structural unit (I) is derived from a phosphonate monomer represented by formula (1) (hereinafter, may also be referred to as the "phosphonate monomer (1)").

$R^1$ in the formula (1) represents a hydrogen atom or a methyl group.

$R^2$ in the formula (1) represents an alkylene group having 1 to 4 carbon atoms. The alkylene group is a divalent hydrocarbon group. Examples of the alkylene group can include a methylene group, an ethylene group, a trimethylene group, a propylene group (also known as a propane-1,2-diyl group), a tetramethylene group, a butane-1,2-diyl group, a butane-1,3-diyl group and the like. Among these, a methylene group or an ethylene group is preferred in view of economical efficiency.

$R^3$ and $R^4$ in the formula (1) each independently represent a hydrogen atom or an alkyl group having 1 to 10 carbon atoms. Examples of the alkyl group can include a methyl group, an ethyl group, a n-propyl group, an i-propyl group, a n-butyl group, an i-butyl group, a s-butyl group, a t-butyl group, a n-pentyl group, an i-pentyl group, a neopentyl group, a 2-methylbutyl group, a 2,2-dimethylpropyl group, a n-hexyl group, an i-hexyl group, a heptyl group, an octyl group, a nonyl group, a decyl group and the like.

Specific examples of the phosphonate monomer (1) can include diethyl methacryloyloxymethyl phosphonate, diethyl 2-methacryloyloxyethyl phosphonate, diethyl 1-methacryloyloxyethyl phosphonate, dimethyl 3-methacryloyloxypropyl phosphonate, dimethyl 2-methacryloyloxypropyl phosphonate, dimethyl 4-methacryloyloxybutyl phosphonate, dimethyl 3-methacryloyloxybutyl phosphonate, dimethyl 2-methacryloyloxybutyl phosphonate; diethyl acryloyloxymethyl phosphonate, diethyl 2-acryloyloxyethyl phosphonate, dimethyl 3-acryloyloxypropyl phosphonate, dimethyl 2-acryloyloxypropyl phosphonate, dimethyl 4-acryloyloxybutyl phosphonate, dimethyl 3-acryloyloxybutyl phosphonate, dimethyl 2-acryloyloxybutyl phosphonate and the like. Among these, diethyl methacryloyloxymethyl phosphonate and diethyl 2-methacryloyloxyethyl phosphonate are preferred in view of increased fire retardancy of a copolymer. These phosphonate monomers (1) may be used alone or in combination of not less than two.

The amount of the structural unit (I) comprised in the copolymer according to the present invention is preferably 15 to 28 mol %, more preferably 18 to 26 mol %, relative to the total number of moles of the structural units comprised in the copolymer in view that both fire retardancy and thermal resistance can be simultaneously achieved. A content of the structural unit (I) of not less than 15 mol % can increase fire retardancy. The fire retardancy of a copolymer tends to increase as the above content increases. However, when the content is more than 28 mol %, the glass transition temperature of the copolymer tends to be lowered. Obviously, when phosphonate monomers (1) are used in combination of two or more, the content of the structural unit (I) derived from the phosphonate monomer (1) described above refers to the total of the contents of the structural units derived from the above not less than two phosphonate monomers (1).

The copolymer according to the present invention has a content of phosphorus atoms from the phosphonate monomer (1) of preferably 2.0 to 6.0% by mass, more preferably 2.5 to 5.0% by mass, relative to the mass of the copolymer.

The structural unit (II) is derived from at least one radical polymerizable monomer (2) selected from the group consisting of methacrylic acid, acrylic acid, a radical polymerizable monomer represented by formula (2a) (hereinafter, may also be referred to as "the radical polymerizable monomer (2a)"), a radical polymerizable monomer represented by formula (2b) (hereinafter, may also be referred to as "the radical polymerizable monomer (2b)"), a radical polymerizable monomer represented by formula (2c) (hereinafter, may also be referred to as "the radical polymerizable monomer (2c)").

In the formula (2a), $R^5$ represents a polycyclic aliphatic hydrocarbon group or an alkyl substituted monocyclic aliphatic hydrocarbon group. An alkyl group in the alkyl substituted monocyclic aliphatic hydrocarbon group is preferably an alkyl group having 1 to 4 carbon atoms such as a methyl group, an isopropyl group, a t-butyl group, and the like.

Examples of the polycyclic aliphatic hydrocarbon group can include a norbornyl group, an isobornyl group, a tricyclodecanyl group, a dicyclopentadienyl group, an adamanthyl group, a fenchyl group, a decalin group and the like. Among these, preferred are a norbornyl group, an isobornyl group, a tricyclodecanyl group, a dicyclopentadienyl group and an adamanthyl group.

Examples of the alkyl substituted monocyclic aliphatic hydrocarbon group can include a 4-methylcyclohexyl group, a 2-methylcyclohexyl group, a 4-isopropylcyclohexyl group, a 2-isopropylcyclohexyl group, a 4-t-butylcyclohexyl group, a 2-t-butylcyclohexyl group and the like. Among these, a 4-t-butylcyclohexyl group is preferred.

Specific examples of the radical polymerizable monomer (2a) can include an alkyl substituted monocyclic aliphatic hydrocarbon methacrylate esters such as 4-methylcyclohexyl methacrylate, 2-methylcyclohexyl methacrylate, 4-isopropylcyclohexyl methacrylate, 2-isopropylcyclohexyl methacrylate, 4-t-butylcyclohexyl methacrylate, 2-t-butyl-cyclohexyl methacrylate and the like; polycyclic aliphatic hydrocarbon methacrylate ester such as 2-norbornyl methacrylate, 2-methyl-2-norbornyl methacrylate, 2-ethyl-2-norbornyl methacrylate, 2-isobornyl methacrylate, 2-methyl-2-isobornyl methacrylate, 2-ethyl-2-isobornyl methacrylate, 8-tricyclo[5.2.1.0$^{2,6}$]decanyl methacrylate, 8-methyl-8-tricyclo[5.2.1.0$^{2,6}$]decanyl methacrylate, 8-ethyl-8-tricyclo[5.2.1.0$^{2,6}$]decanyl methacrylate, 2-adamanthyl methacrylate, 2-methyl-2-adamanthyl methacrylate, 2-ethyl-2-adamanthyl methacrylate, 1-adamanthyl methacrylate, 2-fenchyl methacrylate, 2-methyl-2-fenchyl methacrylate, 2-ethyl-2-fenchyl methacrylate, decalin-1-yl methacrylate, decalin-2-yl methacrylate and the like. Among these, preferred are 2-norbornyl methacrylate, 2-isobornyl methacrylate, 8-tricyclo[5.2.1.0$^{2,6}$]decanyl methacrylate, 8-tricyclo[5.2.1.0$^{2,6}$]deca-3,8-dienyl methacrylate, 2-adamanthyl methacrylate, 1-adamanthyl methacrylate, 4-t-butylcyclohexyl methacrylate. 2-isobornyl methacrylate and 8-tricyclo[5.2.1.0$^{2,6}$]decanyl methacrylate are more preferred in view of availability.

$R^6$ and $R^7$ in the formula (2b) each independently represent a hydrogen atom or an alkyl group having 1 to 10 carbon atoms, and $R^8$ represents an alkyl group having 1 to 10 carbon atoms. Examples of the above alkyl group can include a methyl group, an ethyl group, a n-propyl group, an isopropyl group, a n-hexyl group, a 2-ethylhexyl group and the like.

Specific examples of the radical polymerizable monomer (2b) can include 5-methyl-3-methylidynedihydrofuran-2(3H)-one, 4,5-dimethyl-3-methylidynedihydrofuran-2(3H)-one, 5,5-dimethyl-3-methylidynedihydrofuran-2(3H)-one, 5-ethyl-3-methylidynedihydrofuran-2(3H)-one, 5-decyl-3-methylidynedihydrofuran-2(3H)-one and the like. Among these, 5-methyl-3-methylidynedihydrofuran-2(3H)-one is preferred in view of the ease of synthesis.

In the formula (2c), $R^9$ represents —CH$_2$CHR$^{10}$R$^{11}$, —CHR$^{10}$—CHR$^{11}$R$^{12}$ or —CR$^{19}$R$^{11}$R$^{13}$, and $R^{10}$, $R^{11}$ and $R^{13}$ each independently represent an alkyl group having 1 to 3 carbon atoms, and $R^{12}$ represents a hydrogen atom or an alkyl group having 1 to 3 carbon atoms. Examples of the above alkyl group can include a methyl group, an ethyl group, a n-propyl group, and an isopropyl group.

Specific examples of the radical polymerizable monomer (2c) can include isobutyl methacrylate, s-butyl methacrylate, t-butyl methacrylate, 1-methylbutyl methacrylate, 2-methylbutyl methacrylate, 1,1-dimethylpropyl methacrylate, 1,3-dimethylbutyl methacrylate, 2-ethylbutyl methacrylate, 2-methylpentyl methacrylate and the like. Among these, in view of availability and high thermal resistance, isobutyl methacrylate, s-butyl methacrylate, t-butyl methacrylate are preferred, and t-butyl methacrylate is more preferred.

These radical polymerizable monomers (2) may be used alone or in combination of two or more.

The radical polymerizable monomer (2a), (2b) or (2c) is preferably a monomer in which an ester linkage can easily be broken upon combustion and converted into methacrylic acid or acrylic acid. Methacrylic acid or acrylic acid tends to somewhat reduce the water absorptivity of a copolymer while it tends to increase the thermal resistance of a copolymer. A radical polymerizable monomer (2a) or (2b) tends to reduce the water absorptivity of a copolymer. Further, the radical polymerizable monomer (2a) or (2b) tends to increase the glass transition temperature of a copolymer, but the radical polymerizable monomer (2c) tends not to decrease the glass transition temperature of a copolymer. Combined use of methacrylic acid or acrylic acid and the radical polymerizable monomer (2a) or (2b) is preferred since the resulting copolymer tends to have both low water absorptivity and high thermal resistance.

The lower limit of the amount of the structural unit (II) comprised in the copolymer according to the present invention is preferably 3% by mass, more preferably 5% by mass, even more preferably 10% by mass, and in particular preferably 12% by mass relative to the mass of the copolymer. The upper limit is preferably 80% by mass, more preferably 60% by mass, and even more preferably 40% by mass relative to the mass of the copolymer. An increased content of the structural unit (II) tends to increase the glass transition temperature of a copolymer. Obviously, when radical polymerizable monomers (2) are used in combination of two or more, the content of the structural unit (II) refers to the total of the contents of the structural units derived from the above not less than two radical polymerizable monomers (2).

The copolymer according to the present invention may have a structural unit (III) derived from a radical polymerizable monomer (hereinafter, also referred to as "the radical polymerizable monomer (3)") other than the phosphonate monomer (1) nor the radical polymerizable monomer (2). Examples of the radical polymerizable monomer (3) can include a vinyl aromatic hydrocarbon such as styrene, α-methylstyrene, p-methylstyrene, m-methylstyrene and the like; a vinyl alicyclic hydrocarbon such as vinylcyclohexane, vinylcyclopentane, vinylcyclohexene, vinylcycloheptane, vinylcycloheptene, vinyl norbornene and the like; an ethylenically unsaturated dicarboxylic acid such as maleic anhydride, maleic acid, itaconic acid and the like; an olefin such as ethylene, propylene, 1-butene, isobutylene, 1-octene and the like; a conjugated diene such as butadiene, isoprene, myrcene and the like; acrylamide, methacrylamide, acrylonitrile, methacrylonitrile, vinyl acetate, vinyl ketone, vinyl chloride, vinylidene chloride, vinylidene fluoride; an alkyl acrylate ester such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, dodecyl acrylate and the like; 2-hydroxyethyl acrylate, 2-ethoxyethyl acrylate, glycidyl acrylate, allyl acrylate; an alkyl methacrylate ester such as methyl methacrylate, ethyl methacrylate, n-propyl methacrylate, isopropyl methacrylate, n-butyl methacrylate, amyl methacrylate, isoamylmethacrylate, n-hexyl methacrylate, 2-ethylhexyl methacrylate, pentadecyl methacrylate, dodecyl methacrylate and the like; 2-hydroxyethyl methacrylate, 2-ethoxyethyl methacrylate, glycidyl methacrylate, allyl methacrylate; an unsubstituted monocyclic aliphatic hydrocarbon (meth)acrylate ester such as cyclohexyl (meth)acrylate, cyclopentyl (meth)acrylate, cycloheptyl (meth)acrylate and the like; an aryl (meth)acrylate ester such as phenyl methacrylate, phenyl acrylate and the like; aralkyl (meth)acrylate ester such as benzyl (meth)acrylate, phenoxyethyl (meth)acrylate and the like; an ethylenically unsaturated heterocyclic compound such as 2-vinylfuran, 2-isopropenylfuran, 2-vinylbenzofuran, 2-isopropenylbenzofuran, 2-vinyldibenzofuran, 2-vinylthiophene, 2-isopropenylthiophene, 2-vinyldibenzothiophene, 2-vinylpyrrole, N-vinylindole, N-vinylcarbazole, 2-vinyloxazole, 2-isopropenyloxazole, 2-vinylbenzoxazole, 3-vinylisoxazole, 3-isopropenylisoxazole, 2-vinylthiazole, 2-vinylimidazole, 4(5)-vinylimidazole, N-vinylimidazole, N-vinylimidazoline, 2-vinylbenzimidazole 5(6)-vinylbenzimidazole, 5-isopropenylpyrazole, 2-isopropenyl 1,3,4-oxadiazole, vinyltetrazole, 2-vinylpyridine, 4-vinylpyridine, 2-isopropenylpyridine, 3-vinylpyridine, 3-isopropenylpyridine, 2-vinylquinoline, 2-isopropenylquinoline, 4-vinylquinoline, 4-vinylpyrimidine, 2,4-dimethyl-6-vinyl-S-triazine, 3-methylidynedihydrofuran-2(3H)-one, 4-methyl-3-methylidynedihydrofuran-2(3H)-one, 4-decyl-3-methylidynedihydrofuran-2(3H)-one and the like; a phosphoric acid ester having an ethylenically unsaturated group such as dimethylmethacryloyloxymethyl phosphate, 2-methacryloyloxy-1-methylethyl phosphate; and the like. Among these, alkyl methacrylate ester and alkyl acrylate ester are preferred, and methyl methacrylate and methyl acrylate are more preferred.

These radical polymerizable monomers (3) may be used alone or in combination of two or more. Note that "(meth)acrylic" means "methacrylic or acrylic."

The amount of the structural unit (III) comprised in the copolymer according to the present invention is preferably not more than 65% by mass, more preferably not more than 60% by mass, even more preferably not more than 50% by mass, and in particular preferably not more than 45% by mass relative to the mass of the copolymer in view of a balance between thermal resistance and fire retardancy. Obviously, when radical polymerizable monomers (3) are used in combination of two or more, the content of the structural unit (III) refers to the total of the contents of the structural units derived from the above two or more radical polymerizable monomers (3).

The amount of each structural unit comprised in the copolymer according to the present invention can be quantified by $^1$H-NMR analysis. Further, in a case where quantification is difficult due to peaks overlapping and the like in $^1$H-NMR analysis, quantification can also be performed using pyrolysis gas chromatography measurement.

Specific examples of a preferred copolymer can include methyl methacrylate/methacrylic acid/diethyl methacryloyloxymethyl phosphonate copolymer, methyl methacrylate/methacrylic acid/diethyl 2-methacryloyloxyethyl phosphonate copolymer, methyl methacrylate/acrylic acid/diethyl methacryloyloxymethyl phosphonate copolymer, methyl methacrylate/acrylic acid/diethyl 2-methacryloyloxyethyl phosphonate copolymer, methyl methacrylate/8-tricyclo[5.2.1.0$^{2,6}$]decanyl methacrylate/diethyl methacryloyloxymethyl phosphonate copolymer, methyl methacrylate/8-tricyclo[5.2.1.0$^{2,6}$]decanyl methacrylate/diethyl 2-methacryloyloxyethyl phosphonate copolymer, methylmethacrylate/2-isobornyl methacrylate/diethyl methacryloyloxymethyl phosphonate copolymer, methylmethacrylate/2-isobornyl methacrylate/diethyl 2-methacryloyloxyethyl phosphonate copolymer, methyl methacrylate/5-methyl-3-methylidynedihydrofuran-2(3H)-one/diethyl methacryloyloxymethyl phosphonate copolymer, methyl methacrylate/5-methyl-3-methylidynedihydrofuran-2(3H)-one/diethyl 2-methacryloyloxyethyl phosphonate copolymer, methyl methacrylate/t-butyl methacrylate/diethyl methacryloyloxymethyl phosphonate copolymer, methyl methacrylate/t-butyl methacrylate/diethyl 2-methacryloyloxyethyl phosphonate copolymer, styrene/methacrylic acid/diethyl methacryloyloxymethyl phosphonate copolymer, styrene/methacrylic acid/diethyl 2-methacryloyloxyethyl phosphonate copolymer, methyl methacrylate/8-tricyclo[5.2.1.0$^{2,6}$]decanyl methacrylate/diethyl 2-methacryloyloxyethyl phosphonate/methyl acrylate copolymer, methyl methacrylate/8-tricyclo[5.2.1.0$^{2,6}$]decanyl methacrylate/methacrylic acid/diethyl 2-methacryloyloxyethyl phosphonate copolymer, methyl methacrylate/8-tricyclo[5.2.1.0$^{2,6}$]decanyl methacrylate/t-butyl methacrylate/diethyl 2-methacryloyloxyethyl phosphonate copolymer and the like.

The copolymer according to the present invention has a glass transition temperature of preferably 90 to 180° C., more preferably 100 to 165° C. A copolymer may have insufficient thermal resistance in a case where the glass transition temperature thereof is too low. A copolymer may become fragile if the glass transition temperature thereof is too high. Note that the glass transition temperature is a value measured in accordance with JIS K7121. That is, first, the copolymer according to the present invention is heated to 230° C. and then cooled to room temperature, and subsequently a DSC curve is measured by the differential scanning calorimetry under conditions where the temperature is increased from room temperature to 230° C. at a rate of 10° C./min. The glass transition temperature according to the present invention is defined as a midpoint glass transition temperature obtained from the DSC curve measured during the second heating.

The copolymer according to the present invention has a fire retardancy index of preferably not less than V-1, more preferably V-0 as determined by the UL94V test using a test piece with a thickness of 3.0 to 3.2 mm.

The copolymer according to the present invention has a weight average molecular weight of preferably 50 thousands to 1,000 thousands, more preferably 70 thousands to 500 thousands, and in particular preferably 80 thousands to 300 thousands. In a case where the weight average molecular weight falls within the above ranges, the moldability of a copolymer, and the impact resistance and toughness of a formed article obtained from the copolymer are excellent.

The copolymer according to the present invention has a ratio of weight average molecular weight/number average molecular weight (hereinafter, this ratio may also be referred to as a "molecular weight distribution") of preferably from 1.1 to 10.0, more preferably from 1.5 to 5.0, and in particular preferably from 1.6 to 3.0. In a case where the molecular weight distribution falls within the above ranges, the moldability of a copolymer, the impact resistance and toughness of a formed article obtained from the copolymer, and the other properties are excellent.

Note that the weight average molecular weight and the molecular weight distribution refer to values of standard polystyrene equivalence as measured by GPC (gel permeation chromatography).

The weight average molecular weight and molecular weight distribution described above can be controlled by adjusting the types, amounts and the like of a polymerization initiator and a chain transfer agent.

The copolymer according to the present invention can be obtained by copolymerizing a phosphonate monomer (1), the radical polymerizable monomer (2) and, if desired, the radical polymerizable monomer (3) in a ratio corresponding to the content of the above structural unit. There is no particular limitation for the method of copolymerization, examples of which can include emulsion polymerization method, suspension polymerization method, bulk polymerization method or solution polymerization method and the like. Further, a reaction molding method such as cell casting method is preferred because the heat transferred to a copolymer when molding can be reduced and a formed article having a small yellow index can be obtained. Copolymerization can be initiated in the presence of a polymerization initiator at a predetermined temperature. Further, the weight average molecular weight and the like of the resulting copolymer can be controlled using a chain transfer agent, if desired.

The phosphonate monomer (1), the radical polymerizable monomer (2) and the radical polymerizable monomer (3), which are raw materials for obtaining the copolymer according to the present invention, preferably have a yellow index of not more than 2, more preferably not more than 1 in an optical path length of 10 mm. When the aforementioned yellow index is small, coloring of the resulting copolymer can be suppressed.

Note that the aforementioned yellow index refers to a value of yellowness as computed in accordance with JIS K7373 based on a value as measured in accordance with JIS 28722.

There is no particular limitation for the polymerization initiator used when manufacturing the copolymer according to the present invention as long as a reactive radical is generated. Examples include organic peroxides such as t-hexylperoxyisopropyl monocarbonate, t-hexylperoxy-2-ethylhexanoate, 1,1,3,3-tetramethylbutylperoxy-2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis (t-hexylperoxy)cyclohexane, benzoyl peroxide, 3,5,5-trimethylhexanoyl peroxide, lauroyl peroxide and the like; azo compounds such as 2,2'-azobis(2-methylpropionitrile), 2,2'-azobis(2-methylbutyronitrile), dimethyl 2,2'-azobis(2-methylpropionate) and the like; persulfates such as ammonium persulfate, potassium persulfate, sodium persulfate and the like. Among these, azo compounds are preferred. These polymerization initiators may be used alone or in combination of not less than two. Further, there is no particular limitation for the addition amount, the addition method and the like of a polymerization initiator, and they are suitably selected depending on applications. For example, the amount of a polymerization initiator is preferably in a range of 0.0001 to 0.2 part by mass, more preferably in a range of 0.001 to 0.1 part by mass relative to 100 parts by mass in total of the monomers. Obviously, when polymerization initiators are used in combination of two or more, the amount of the aforementioned polymerization initiator refers to the total amounts of the above two or more polymerization initiators.

Examples of the chain transfer agent used for manufacture of the copolymer according to the present invention can include alkyl mercaptans such as n-octylmercaptan, n-dodecylmercaptan, t-dodecylmercaptan, 1,4-butanedithiol, 1,6-hexanedithiol, ethyleneglycol bisthiopropionate, butanediol bisthioglycolate, butanediol bisthiopropionate, hexandiol bisthioglycolate, hexandiol bisthiopropionate, trimethylolpropanetris-(β-thiopropionate), pentaerythritol tetrakis thiopropionate and the like; α-methylstyrene dimer; terpinolene and the like. Among these, monofunctional alkyl mercaptans such as n-octylmercaptan, n-dodecylmercaptan and the like are preferred. These chain transfer agents may be used alone or in combination of two or more. The used amount of a chain transfer agent is preferably 0.01 to 1 part by mass, more preferably 0.02 to 0.8 part by mass, even more preferably 0.03 to 0.6 part by mass relative to 100 parts by mass in total of the monomers. Obviously, when chain transfer agents are used in combination of two or more, the aforementioned used amount of a chain transfer agent is the total of the used amounts of the above two or more chain transfer agents.

When copolymerizing the phosphonate monomer (1), the radical polymerizable monomer (2) and the optional radical polymerizable monomer (3), all materials required for manufacturing a copolymer may be mixed and then introduced into a reactor, or may be separately introduced into a reactor. Preferably, all materials required for manufacturing a copolymer may be mixed and then introduced into a reactor. The aforementioned mixing is preferably performed under an inert gas atmosphere such as nitrogen gas or the like.

A temperature when performing the copolymerization is preferably 0 to 200° C., more preferably 20 to 180° C. Further, depending on a reaction size, the length of time for performing copolymerization is preferably 0.1 to 20 hours, more preferably 0.5 to 10 hours in view of economical efficiency. Moreover, copolymerization is preferably performed under an inert gas atmosphere such as nitrogen gas or the like.

After completion of the copolymerization, unreacted monomers and a solvent can be removed in accordance with a known method. Further, pulverization, pelletization and the like may be performed according to a known method in order to facilitate forming of a copolymer.

In the present invention, various additives may be added to a copolymer, if desired. Examples of the additive can include an antioxidant, a heat deterioration inhibitor, an ultraviolet absorber, a light stabilizer, a lubricant, a parting agent, a polymer processing aid, an impact resistance modifier, an organic dye, a light diffusion agent, a delusterant, a phosphor, an antistatic agent, a flame retardant, a plasticizer, an inorganic filler, a fiber and the like. The additive amounts of such various additives can be appropriately determined in a range where the effect of the present invention is not impaired. The additive amount of each additive is preferably 0.001 to 5 parts by mass, more preferably 0.01 to 1 part by mass relative to 100 parts by mass in total of a copolymer and other polymers added as desired.

An antioxidizing agent alone has an effect of preventing oxidation deterioration of a resin in the presence of oxygen. For example, a phosphorus antioxidant, a hindered phenol antioxidant, a thioether antioxidant and the like can be mentioned as the antioxidizing agent. These antioxidizing agents may be used alone or in combination of two or more. Among these, a phosphorus antioxidant and a hindered phenol antioxidant are preferred, and combined use of a phosphorus antioxidant and a hindered phenol antioxidant is more preferred in view of an effect for preventing deterioration of optical properties due to coloring.

In a case where a phosphorus antioxidant and a hindered phenol antioxidant are used in combination, there is no particular limitation for their ratio, but it is preferably 1/5 to 2/1, more preferably 1/2 to 1/1 in the mass ratio of phosphorus antioxidant/hindered phenol antioxidant.

Examples of the phosphorus antioxidant can include 2,2-methylenebis(4,6-di-t-butylphenyl)octyl phosphite (ADEKA Corporation, Product name: ADK STAB HP-10), tris(2,4-di-t-butylphenyl)phosphite (BASF A.G.; Product name: IRUGAFOS 168) and the like.

Examples of the hindered phenol antioxidant can include pentaerythrityl-tetrakis[3-(3,5-di-t-butyl-4-hydroxyphenyl) propionate] (BASF A.G.; Product name: IRGANOX 1010), octadecyl-3-(3,5-di-t-butyl-4-hydroxyphenyl)propionate (BASF A.G.; Product name: IRGANOX 1076) and the like.

A heat deterioration inhibitor can prevent heat deterioration of a copolymer by capturing polymer radicals generated when exposed to high temperature under conditions where essentially no oxygen is present.

Examples of the above heat deterioration inhibitor can include 2-t-butyl-6-(3'-t-butyl-5'-methyl-hydroxybenzyl)-4-methylphenyl acrylate (Sumitomo Chemical Co., Ltd.; Product name: Sumilizer GM), 2,4-di-t-amyl-6-(3',5'-di-t-amyl 2'-hydroxy-α-methylbenzyl)phenyl acrylate (Sumitomo Chemical Co., Ltd.; Product name: Sumilizer GS) and the like.

An ultraviolet absorber is a compound capable of absorbing ultraviolet light. An ultraviolet absorber is a compound which is believed to have a function to primarily transform light energy into thermal energy.

Examples of the ultraviolet absorber can include benzophenones, benzotriazols, triazines, benzoates, salicylates, cyanoacrylates, anilideoxalates, malonic acid esters, formamidines and the like, and benzotriazols, anilides are preferred. These may be used alone or in combination of two or more.

Examples of benzotriazols can include 2-(2H-benzotriazol-2-yl)-4-(1,1,3,3-tetramethylbutyl)phenol (Ciba specialty chemicals Inc.; Product name TINUVIN 329), 2-(2H-benzotriazol-2-yl)-4,6-bis(1-methyl-1-phenylethyl)phenol (BASF A.G.; Product name: TINUVIN 234) and the like.

Examples of anilides can include 2-ethyl-2'-ethoxy-oxalanilide (Clariant Japan K.K.; Product name: Sanduvor VSU) and the like.

Among these ultraviolet absorbers, benzotriazols are most preferably used because deterioration of a copolymer due to exposure to ultraviolet radiation can be effectively suppressed.

A light stabilizer is a compound which is believed to have a function to primarily capture radicals generated due to light oxidation. As a suitable light stabilizer, hindered amines such as a compound having a 2,2,6,6-tetraalkylpiperidine skeleton can be mentioned.

Examples of the lubricant can include stearic acid, behenic acid, stearoamide acid, methylenebis stearoamide, hydroxystearic acid triglyceride, paraffin wax, ketone wax, octyl alcohol, hardened oils and the like.

A parting agent is a compound having a function to facilitate release of a formed article from a mold. Examples of the parting agent can include higher alcohols such as cetyl alcohol, stearyl alcohol and the like; glycerin higher fatty acid esters such as stearic acid monoglyceride, stearic acid diglyceride and the like. In the present invention, combined use of a higher alcohol and a glycerin fatty acid monoester is preferred as the parting agent. In a case where a higher alcohol and a glycerin fatty acid monoester are used in combination, there is no particular limitation for their ratio, but it is preferably 2.5/1 to 3.5/1, more preferably 2.8/1 to 3.2/1 in the mass ratio of higher alcohol/glycerin fatty acid monoester.

A polymer processing aid is a compound showing an effect on the precision in thickness and the formation of a thinner film when shaping a copolymer. A polymer processing aid usually comprises polymer particles having a particle diameter of 0.05 to 0.5 μm which can be manufactured by the emulsion polymerization method.

These polymer particles may be monolayer particles consisting of a polymer having a single composition ratio and a single limiting viscosity, or may be multilayer particles consisting of two or more polymers having a different composition ratio or a different limiting viscosity. Among these, preferred examples can include two-layered particles comprising an inner layer comprising a polymer with a limiting viscosity of less than 5 dl/g and an outer layer comprising a polymer with a limiting viscosity of not less than 5 dl/g. A polymer processing aid preferably has a limiting viscosity of 3 to 6 dl/g as a whole.

Examples of the impact resistance modifier can include a core-shell modifier comprising acrylic rubber or diene rubber as a core layer component; a modifier comprising multiple rubber particles; and the like.

As the organic dye, a compound having a function to transform ultraviolet light which may be harmful to a copolymer into visible light is preferably used.

Examples of the light diffusion agent or the delusterant can include glass particulates, polysiloxane cross-linked particulates, cross-linked polymer particles, talc, calcium carbonate, barium sulfate and the like.

Examples of the phosphor can include a fluorescent pigment, a fluorescent dye, a fluorescent white dye, a fluorescent whitening agent, a fluorescent bleaching agent and the like.

Examples of the antistatic agent can include stearoamide propyldimethyl-β-hydroxyethyl ammonium nitrate and the like.

Examples of the flame retardant can include organohalogen flame retardants such as tetrabromobisphenol A, decabromodiphenyloxide, brominated polycarbonate and the like; halogen-free flame retardants such as antimony oxide, aluminum hydroxide, zinc borate, phosphoric acid, anhydrous orthophosphoric acid, tricresyl phosphate, hydroxymethyldiethylphosphonate, a reaction product of biphenyl-4, 4'-diol/phenol/phosphoryl=trichloride having 4,4'-bis (diphenylphosphoryl)-1,1'-biphenyl as the main component (for example, FP800 from ADEKA Corporation) and the like.

Examples of the plasticizer can include phosphoric acid triester plasticizers such as tricresyl phosphate, trixylenyl phosphate, triphenyl phosphate, triethylphenyl phosphate, diphenylcresyl phosphate, monophenyldicresyl phosphate, diphenylmonoxylenyl phosphate, monophenyldixylenyl phosphate, tributyl phosphate and the like, triethyl phosphate; phthalate ester plasticizers such as dimethyl phthalate, dibutyl phthalate, diheptyl phthalate, di-n-octyl phthalate, di-2-ethylhexyl phthalate, diisononyl phthalate, octyl decyl phthalate, benzyl butyl phthalate and the like; fatty acid monobasic acid ester plasticizers such as butyl oleate, glycerin monooleic acid ester and the like; divalent alcohol ester plasticizers; oxyacid ester plasticizers; and the like.

Further, examples of the plasticizer can include squalane (also known as 2,6,10,15,19,23-hexamethyltetracosane, $C_{30}H_{62}$, Mw=422.8), liquid paraffin (white oil, ISO VG10, ISO VG15, ISO VG32, ISO VG68, ISO VG100, ISO VG8, ISO VG21 and the like as defined in JIS-K-2231), polyisobutene, hydrogenated polybutadiene, hydrogenated polyisoprene and the like. Among these, preferred are squalane, liquid paraffin and polyisobutene.

Examples of the inorganic filler can include calcium carbonate, talc, carbon black, titanium oxide, silica, clay, barium sulfate, magnesium carbonate and the like.

Examples of the fiber can include glass fibers, carbon fibers and the like.

The formed article according to the present invention comprises the copolymer according to the present invention. The formed article according to the present invention is not particularly limited by a manufacturing method thereof. The formed article according to the present invention can be obtained by performing shaping by melt forming methods such as T-die method (laminating method, co-extruding method and the like), inflation method (co-extruding method and the like), compaction formation method, blow molding method, calendering method, vacuum forming method, the injection forming method (insert method, two-color method, press method, core back method, sandwich method and the like); and the solution casting method and the like. Further, the formed article according to the present invention can be obtained by the reaction molding method such as the cell casting method, i.e. by simultaneously performing a forming and polymerization reaction of a monomer mixture in a mold. Among these forming methods, the T-die method, the inflation method, the injection forming method, and the cell casting method are preferred in view of high productivity, cost and the like.

Further, forming may be performed multiple times to obtain the formed article according to the present invention. For example, the copolymer according to the present invention is shaped to obtain a pelletized copolymer, and then the pelletized copolymer can be further formed into a desired shape.

In manufacture of the formed article according to the present invention, other polymers may be mixed with the copolymer according to the present invention, and then formed in a range where the effect of the present invention is not impaired. Examples of the above other polymers can include polyolefin resins such as polyethylene, polypropylene, polybutene-1, poly-4-methylpentene-1, polynorbornene and the like; ethylene ionomers; styrene resins such as polystyrene, styrene-maleic anhydride copolymer, high impact polystyrene, AS resin, ABS resin, AES resin, AAS resin, ACS resin, MBS resin and the like; methyl methacrylate polymers, methyl methacrylate-styrene copolymers; polyester resins such as polyethylene terephthalate, polybutylene terephthalate and the like; polyamides such as nylon 6, nylon 66, polyamide elastomers and the like; polycarbonate, polyvinyl chloride, polyvinylidene chloride, polyvinyl alcohol, ethylene-vinyl alcohol copolymers, polyacetal, polyvinylidene fluoride, polyurethane, modified polyphenylene ether, polyphenylene sulfide, modified silicone resins; acrylic rubbers, silicone rubbers; styrene thermoplastic elastomers such as SEPS, SEBS, SIS and the like; olefin rubbers such as IR, EPR, EPDM and the like.

Further, in manufacture of the formed article according to the present invention, various additives may be added, if desired, in a range where the effect of the present invention is not impaired.

The formed article according to the present invention may be used for the manufacture of layered products. Layered products may be those in which only the formed articles according to the present invention are layered, or may be those in which the formed article according to the present invention and another material are layered.

There is no particular limitation for the method for producing a layered product. Examples of the method for producing a layered product can include a method in which two or more polymers are simultaneously extruded (co-extruding method); a method in which two or more formed articles are welded by heat, ultrasound, high frequency and the like (welding method); a method in which two or more formed articles are adhered with an ultraviolet curable adhesive, a thermosetting adhesive, a radiation curable adhesive and the like (adhesion method); a method in which a sheet or a film is placed inside a mold, and a melted polymer is then poured thereinto (insert molding method); a method in which other substrates are deposited by chemical vapor deposition or physical vapor deposition (vapor deposition method); a method in which a coating material comprising other substrates is applied to form a film (application method); and the like. Further, in the welding method or the adhesion method, a surface to be welded or adhered may be subjected to surface treatment with a known primer, or corona discharge treatment, plasma treatment and the like before welding or adhesion.

There is no particular limitation for the other materials to be layered along with the formed article according to the present invention, and they can be appropriately selected depending on the applications of a layered product. There is no particular limitation for the other materials in a case where a layered product is used as an optical component. Examples can include a hard-coating material, an antireflective material, liquid crystal, a cyclic olefin ring-opening polymer or a hydrogenated product thereof, a cyclic olefin addition copolymer, an aliphatic olefine resin, an acrylic polymer, a polycarbonate resin, a liquid crystal polymer, soda glass, quartz glass and the like.

For the formed article according to the present invention or a layered product comprising the above formed article, a surface thereof may be subjected to printing, or may be shaped by cutting or embossing work and the like. In a case where it is layered with another material by the insert molding method after printing or shaping, a character, pattern, unevenness and the like which have been formed by printing or shaping will be enclosed between the formed article according to the present invention and the another material. Since the formed article according to the present invention has excellent transparency, the character, pattern, unevenness and the like which have been enclosed can be clearly observed.

The formed article according to the present invention is preferably a film or a sheet. In general, a film refers to a planar formed article having a thickness of not less than 0.005 mm and not more than 0.25 mm. A sheet refers to a planar formed article having a thickness of more than 0.25 mm.

The copolymer and formed article according to the present invention, which are excellent in transparency, fire retardancy and thermal resistance, can be used in various fields such as optics, foods, health care, automobiles, electrics/electronics and the like. For example, the copolymer and formed article according to the present invention are useful for various optical members (finders, filters, prisms, Fresnel lenses and the like) for optical devices (microscopes, binoculars, cameras and the like), various optical members (light guiding films/sheets, phase difference films/sheets, polarizing films/sheets, polarizing plate protective films/sheets, light diffuser films/sheets, prism films/sheets, reflective films/sheets, antireflective films/sheets, view angle enlarging films/sheets, antiglare films/sheets, brightness enhancing films/sheets, front plates and the like) for display devices (televisions, touch panels, personal computers, mobile devices and the like), optical members such as optical switches, optical connecters and the like; illumination members such as lighting covers and the like. Further, they are useful for outdoor uses such as house components (roof, window, drainspout, wall and the like), retroreflective films/sheets, agricultural films/sheets, signboards, decoration members and the like.

EXAMPLES

The present invention will be described in detail with reference to Examples and Comparative Examples. Note that the present invention shall not be limited by the following Examples. Further, the present invention encompasses all aspects including any combinations of those representing technical features such as characteristic values, forms, manufacturing methods, uses and the like as described above.

Measurements and the like of physical property values in the Examples and Comparative Examples were performed according to the following methods.
[Composition Analysis of Copolymer]
Instrument: Nuclear magnetic resonance system (Bruker ULTRA SHIELD 400 PLUS)
Solvent: deuterated chloroform
Measured nuclide: $^1$H
Measurement temperature: room temperature
Integration times: 64 times
[Weight Average Molecular Weight, Molecular Weight Distribution]

The weight average molecular weights and molecular weight distributions of copolymers obtained in the Examples and Comparative Examples were determined in terms of polystyrene equivalence based on measurements by gel permeation chromatography (GPC). TOSOHHLC-8320 (model number) was used as a GPC device, and two TOSOH TSKgel SuperMultipore HZM-Ms connected with one SuperHZ4000 in series were used as column.
Eluent: tetrahydrofuran
Eluent flow rate: 0.35 ml/min
Column temperature: 40° C.
Calibration curve: created using 10 points from the polystyrene standard.
[Glass Transition Temperature]

Copolymers obtained in the Examples and Comparative Examples were heated once to 230° C. in accordance with JIS K7121, and then cooled to room temperature. Then a DSC curve was measured by the differential scanning calorimetry under conditions where temperature was increased from room temperature to 230° C. at a rate of 10° C./min. The midpoint glass transition temperature determined from the DSC curve measured during the second heating was used as a glass transition temperature in the present invention. Shimadzu DSC-50 (model number) was used as a measurement device.
[Fire Retardancy]

Test pieces with a thickness of 3.2 mm obtained in the Examples and Comparative Examples were allowed to stand for 48 hours under the environment of 23° C., 50% RH. Test pieces held perpendicularly were flamed twice with a burner for 10 seconds each time in accordance with the UL94V test. Fire retardancy was evaluated using the respective afterflame time and drip properties thereof. Note that those having very low fire retardancy and failing the UL94V test were indicated as "BS" (Below Standard).
[Transparency]

In accordance with JIS K7361-1, the total light transmittances of 3.2 mm thick test pieces obtained in the Examples and Comparative Examples were measured with an HR-100 (model number) from Murakami Color Research Laboratory Co., Ltd. Transparency was evaluated with the following indicators.
A: total light transmittance is not less than 85%
B: total light transmittance is less than 85%
[Water Absorbability]

Test pieces obtained in the Examples and Comparative Examples were dried for 3 days under the environment of 50° C., 667 Pa (5 mmHg) to obtain bone-dry test pieces. The bone-dry test pieces were measured for mass W0. Then, the bone-dry test pieces were immersed in water at a temperature of 23° C., and allowed to stand for 2 months. The test pieces were measured for mass W1 after being pulled out from the water. Saturated water absorption (%) were computed by the following expression.

Saturated water absorption=$\{(W1-W0)/W0\}\times 100$

Water absorbability was evaluated with the following indictors.
A: Saturated water absorption is not more than 40.
B: Saturated water absorption is more than 4% and not more than 10%.
C: Saturated water absorption is more than 10%.
[Yellow Index]

Test pieces with a thickness of 3.2 mm obtained in the Examples and Comparative Examples were measured in an optical path length of 3.2 mm using a colorimetry color difference meter ZE-2000 from Nippon Denshoku Industries Co., Ltd. in accordance with JIS Z 8722. The value of yellowness computed based on the aforementioned measured value in accordance with JIS K 7373 was taken as the yellow index (YI).
[Amount of Char]

Copolymers obtained in the Examples and Comparative Examples were subjected to thermogravimetry under the conditions where they were heated from room temperature to 600° C. at 10° C./min under the atmospheric air in accordance with JIS K 7120. Shimadzu-50 (model number) was used as the measurement device. The amount of char (% by mass) was computed by the following expression.

Amount of char=$(W3/W2)\times 100$

W2 and W3 in the above expression are defined as follows.
W2: Weight of a copolymer at the start of measurement
W3: Weight of the copolymer at 500° C.
Fire retardancy is believed to increase as the amount of char increases.

As the phosphonate monomer (1), prepared were diethyl methacryloyloxymethyl phosphonate (see the formula (A). Hereinafter, referred to as "DEMMPO.") and diethyl 2-methacryloyloxyethyl phosphonate (see the formula (B). Hereinafter, referred to as "DEMEPO."). DEMMPO was synthesized by the method described in Non-patent Document 1. DEMEPO was synthesized by the method described in Non-patent Document 3.

[Formula (A)]

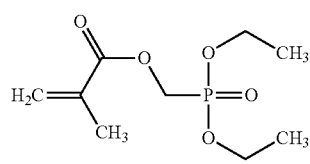

(A)

-continued

[Formula (B)]

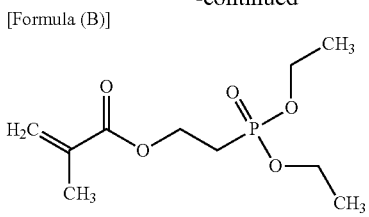
(B)

As the radical polymerizable monomer (2), prepared were methacrylic acid (hereinafter, referred to as "MAA"), t-butyl methacrylate (hereinafter, referred to as "t-BMA."), 8-tricyclo[5.2.1.0$^{2,6}$]decanyl methacrylate (see the formula (C). Hereinafter, referred to as "TCDMA."), 2-isobornyl methacrylate (see the formula (D). Hereinafter, referred to as "IBMA."), and 5-methyl-3-methylidynedihydrofuran-2(3H)-one (see the formula (E). Hereinafter, referred to as "MMBL."). MMBL was synthesized by the method described in Non-patent Document 5.

[Formula (C)]

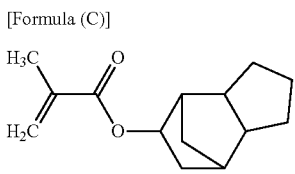
(C)

[Formula (D)]

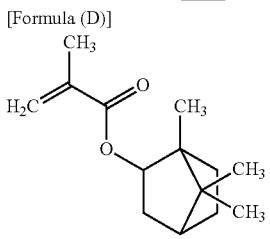
(D)

[Formula (E)]

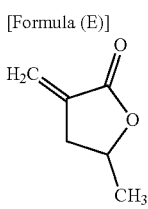
(E)

As the radical polymerizable monomer (3), prepared were methyl methacrylate (hereinafter, referred to as "MMA."), methyl acrylate (hereinafter, referred to as "MA."), styrene (hereinafter, referred to as "St."), diethyl 2-methacryloyloxyethyl phosphate (see the formula (F). Hereinafter, referred to as "DEMEPA."), and 2-methacryloyloxy-1-methylethyl phosphate (see the formula (G). Hereinafter, referred to as "MMEPA."). DEMEPA was synthesized by the method described in Non-patent Document 4. Further, MMEPA was synthesized as described in Synthesis Example 1.

[Formula (F)]

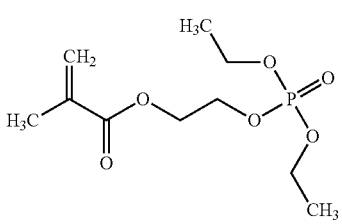
(F)

-continued

[Formula (G)]

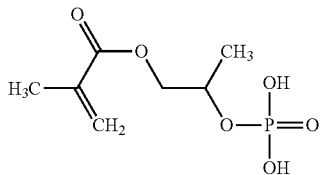
(G)

Synthesis Example 1

In 400 ml of methylene chloride, 153.4 g (1.0 mol) of phosphoryl chloride was dissolved to obtain a solution. To this solution, a mixture of 142 g (0.99 mol) of 2-hydroxypropyl methacrylate and 100 g (0.99 mol) of triethylamine was added dropwise over 2 hours while stirring under a nitrogen atmosphere at not higher than 10° C. Then, it was heated to 50° C., and stirred for an additional 2 hours. Subsequently, it was cooled to room temperature, and water was then added to quench the reaction. The water layer was removed. The organic layer was washed twice with 200 ml of 0.1 N hydrochloric acid saturated with sodium chloride, and then washed with 200 ml of water until the pH became neutral. The organic layer was dewatered with magnesium sulfate overnight and then percolated. The colature was dried under a reduced pressure to obtain MMEPA.

Example 1

A monomer mixture was obtained by mixing 30 parts by mass of DEMMPO (20 mol % relative to the monomer mixture), 30 parts by mass of TCDMA, 38 parts by mass of MMA and 2 parts by mass of MA. To this monomer mixture, 0.1 part by mass of a polymerization initiator (2,2'-azobis(2-methylpropionitrile), hydrogen abstraction capability: 1%, 1 hour half-life temperature: 83° C.) and 0.1 part by mass of a chain transfer agent (n-octylmercaptan) were added and dissolved to obtain a raw material liquid.

A mixed liquid was obtained by mixing 100 parts by mass of ion exchange water, 0.03 part by mass of sodium sulfate and 0.46 part by mass of a suspension dispersing agent (B). Into a pressure resistant polymerization vessel, introduced were 420 parts by mass of the above mixed liquid and 210 parts by mass of the above raw material liquid. Temperature was then brought up to 70° C. while stirring under a nitrogen atmosphere to initiate a polymerization reaction. Temperature was increased to 90° C. at 3 hours from the initiation of polymerization reaction, and stirring was continued for an additional 1 hour to obtain a dispersion liquid in which bead-like particles were dispersed.

The dispersion liquid obtained was percolated, and the particles were washed with ion exchange water. Substantially, they were dried under a reduced pressure of 100 Pa at 80° C. for 4 hours to obtain a bead-like copolymer.

The obtained copolymer was fed to a twin screw extruder controlled at 230° C. to remove volatile components such as unreacted monomers, and then a resin component was extruded into a strand. The above strand was cut with a pelletizer to obtain a pelleted copolymer.

The glass transition temperature of the obtained pelleted copolymer was measured. Further, the above pelleted copolymer was heat-pressed at 230° C. to obtain a sheet-like formed article with a thickness of 3.2 mm. A test piece with a length of 127 mm×a width of 13 mm×a thickness of 3.2 mm was cut out of the obtained sheet-like formed article.

Evaluations of fire retardancy, transparency and water absorptivity were performed. Results are shown in Table 1.

TABLE 1

|  |  | Examples |  |  |  |  |  |
|---|---|---|---|---|---|---|---|
|  |  | 1 | 2 | 3 | 4 | 5 | 6 |
| Monomer composition in monomer mixture (mass %) | | | | | | | |
| Monomer (1) | DEMMPO | 30 | 35 | 30 | 30 | 30 | |
|  | DEMEPO | | | | | | 35 |
| Monomer (2) | TCDMA | 30 | 40 | | | | 35 |
|  | IBMA | | | | | 30 | |
|  | MMBL | | | 70 | 30 | | |
| Monomer (3) | MMA | 38 | 23 | | 40 | 38 | 28 |
|  | MA | 2 | 2 | | | 2 | 2 |
| Structural unit composition in copolymer (mass %) | | | | | | | |
| Monomer (1)-derived structural unit | DEMMPO | 30 | 34 | 29 | 29 | 30 | |
|  | DEMEPO | | | | | | 33 |
| Monomer (2)-derived structural unit | TCDMA | 31 | 41 | | | | 37 |
|  | IBMA | | | | | 31 | |
|  | MMBL | | | 71 | 28 | | |
| Monomer (3)-derived structural unit | MMA | 37 | 23 | | 43 | 37 | 28 |
|  | MA | 2 | 2 | | | 2 | 2 |
| Weight average molecular weight ($\times 10^3$) | | 135.0 | 179.0 | 78.3 | 85.0 | 154.8 | 121.8 |
| Molecular weight distribution | | 1.8 | 2.0 | 2.1 | 2.0 | 1.8 | 2.4 |
| Content of monomer (1)-derived structural unit (mol %) | | 20 | 26 | 15 | 15 | 20 | 23 |
| Content of phosphorus atom (mass %) | | 3.9 | 4.5 | 3.8 | 3.8 | 3.9 | 4.1 |
| Glass transition temperature (° C.) | | 105 | 110 | 158 | 110 | 104 | 107 |
| Fire retardancy | | V-0 | V-1 | V-1 | V-1 | V-0 | V-1 |
| Transparency | | A | A | A | A | A | A |
| Water absorbability | | A | A | B | B | A | A |
| YI | | 4.4 | 4.8 | 6.1 | 5.3 | 4.6 | 4.8 |
| Amount of char (mass %) | | 23 | 27 | 22 | 20 | 23 | 20 |

Examples 2 to 6 and Comparative Examples 1 to 8

Pelleted copolymers were obtained in the same manner as Example 1 except that recipes shown in Table 1 were used instead. Various physical-property measurements were performed for these pelleted copolymers, and test pieces were evaluated in the same manner as Example 1. Results are shown in Tables 1 and 2.

TABLE 2

|  |  | Comparative Examples |  |  |  |  |  |
|---|---|---|---|---|---|---|---|
|  |  | 1 | 2 | 3 | 4 | 5 | 6 |
| Monomer composition in monomer mixture (mass %) | | | | | | | |
| Monomer (1) | DEMMPO | | 10 | 20 | 30 | 50 | |
| Monomer (3) | MMA | 100 | 88 | 78 | 68 | 48 | 68 |
|  | MA | | 2 | 2 | 2 | 2 | 2 |
|  | DEMEPA | | | | | | 30 |
| Structural unit composition in copolymer (mass %) | | | | | | | |
| Monomer (1)-derived structural unit | DEMMPO | | 12 | 21 | 31 | 51 | |
| Monomer (3)-derived structural unit | MMA | 100 | 86 | 77 | 67 | 47 | 67 |
|  | MA | | 2 | 2 | 2 | 2 | 2 |
|  | DEMEPA | | | | | | 31 |
| Weight average molecular weight ($\times 10^3$) | | 105.0 | 160.0 | 166.0 | 185.0 | 208.0 | 69.8 |
| Molecular weight distribution | | 1.8 | 2.1 | 2.2 | 2.4 | 2.4 | 1.8 |
| Content of monomer (1)-derived structural unit (mol %) | | 0 | 5 | 10 | 16 | 31 | 0 |
| Content of phosphorus atom (mass %) | | 0 | 1.6 | 2.8 | 4.1 | 6.7 | 3.6 |
| Glass transition temperature (° C.) | | 119 | 109 | 102 | 92 | 74 | 83 |
| Fire retardancy | | BS | BS | V-2 | V-2 | V-0 | BS |
| Transparency | | A | A | A | A | A | A |
| Water absorbability | | A | A | B | B | C | A |
| YI | | 4.4 | 5.0 | 4.6 | 5.1 | 4.1 | 4.5 |
| Amount of char (mass %) | | 0 | 3 | 7 | 12 | 26 | 8 |

Example 7

A monomer mixture was obtained by mixing 30 parts by mass of DEMMPO, 15 parts by mass of TCDMA, 6 parts by mass of methacrylic acid (hereinafter, may be abbreviated as MAA), 47 parts by mass of MMA and 2 parts by mass of MA. To this monomer mixture, 0.1 part by mass of a polymerization initiator (2,2'-azobis(2-methylpropionitrile), hydrogen abstraction capability: 1%, 1 hour half-life temperature: 83° C.) was added and dissolved to obtain a raw material liquid.

The above raw material liquid was injected into a glass cell comprising two water-repellent glass plates (10 mm in thickness, 30 cm×30 cm) and a gasket made of a vinyl chloride resin, and was degassed at 760 mmHg for 3 minutes. This glass cell was held at 70° C. for 2 hours, and then at 120° C. for 2 hours to polymerize the monomer mixture. Subsequently, the glass plates were removed to obtain a sheet-like formed article with a thickness of 3.2 mm. A test piece with a length of 127 mm×a width of 13 mm×a thickness of 3.2 mm was cut out of the obtained sheet-like formed article. Evaluations of fire retardancy, transparency and water absorptivity were performed. The obtained sheet-like formed article, which was made of a polymer with a very high molecular weight, did not dissolve in a solvent, and was only swelled. Therefore, the molecular weight could not be measured by GPC. An estimated weight average molecular weight is not less than one million g/mol. The structural unit (mol %) derived from DEMMPO as the phosphonate monomer (1) and the content (% by mass) of phosphorus atoms were computed by $^1$H-NMR measurement in the swelled state. Results are shown in Table 3.

TABLE 3

|  |  | Comp. Examples ||| Examples |||||
|---|---|---|---|---|---|---|---|---|---|
|  |  | 7 | 8 | 9 | 7 | 8 | 9 | 10 | 11 |
| Monomer composition in monomer mixture (mass %) ||||||||||
| Monomer (1) | DEMMPO |  |  |  | 30 | 30 | 30 | 30 | 30 |
| Monomer (2) | TCDMA | 30 | 30 |  | 15 | 20 |  |  |  |
|  | MAA |  |  |  | 6 | 4 | 12 | 6 | 12 |
|  | t-BMA |  |  |  |  |  |  | 12 |  |
| Monomer (3) | MMA | 38 | 68 | 80 | 47 | 44 | 56 | 52 |  |
|  | MA | 2 | 2 |  | 2 | 2 | 2 |  |  |
|  | St |  |  |  |  |  |  |  | 58 |
|  | DEMEPA | 30 |  |  |  |  |  |  |  |
|  | MMEPA |  |  | 20 |  |  |  |  |  |
| Structural unit composition in copolymer (mass %) ||||||||||
| Monomer (1)-derived structural unit | DEMMPO |  |  |  | 30 | 30 | 30 | 30 | 30 |
| Monomer (2)-derived structural unit | TCDMA | 30 | 30 |  | 15 | 20 |  |  |  |
|  | MAA |  |  |  | 6 | 4 | 12 | 6 | 12 |
|  | t-BMA |  |  |  |  |  |  | 12 |  |
| Monomer (3)-derived structural unit | MMA | 39 | 68 | 80 | 47 | 44 | 56 | 52 |  |
|  | MA | 2 | 2 |  | 0 | 2 | 2 |  |  |
|  | St |  |  |  |  |  |  |  | 58 |
|  | DEMEPA | 29 |  |  |  |  |  |  |  |
|  | MMEPA |  |  | 20 |  |  |  |  |  |
| Weight average molecular weight (×10³) || 109.3 | 123.0 | >1000 | >1000 | >1000 | >1000 | >1000 | >1000 |
| Molecular weight distribution || 1.9 | 1.8 | — | — | — | — | — | — |
| Content of monomer (1)-derived structural unit (mol %) || 0 | 0 | 0 | 17 | 18 | 15 | 16 | 15 |
| Content of phosphorus atom (mass %) || 3.4 | 0 | 2.2 | 3.9 | 3.9 | 3.9 | 3.9 | 3.9 |
| Glass transition temperature (° C.) || 95 | 125 | 89 | 107 | 104 | 113 | 100 | 100 |
| Fire retardancy || BS | BS | V-2 | V-0 | V-1 | V-0 | V-0 | V-1 |
| Transparency || A | A | B | A | A | A | A | A |
| Water absorbability || B | A | B | B | A | B | B | A |
| YI || 4.3 | 4.1 | 3.1 | 3.0 | 3.1 | 3.3 | 3.0 | 4.0 |
| Amount of char (mass %) || 14 | 0 | 6 | 28 | 26 | 33 | 29 | 26 |

Example 8

A sheet-like formed article with a thickness of 3.2 mm was produced in the same manner as Example 7 except that a raw material liquid was prepared using 20 parts by mass of TCDMA and 4 parts by mass of MAA instead of 15 parts by mass of TCDMA and 6 parts by mass of MAA. Results are shown in Table 3.

Examples 9 to 11

Sheet-like formed articles with a thickness of 3.2 mm were produced in the same manner as Example 7 except that recipes shown in Table 3 were used instead. Results are shown in Table 3.

Comparative Example 9

100 parts by mass of MMA was mixed with 0.002 part by mass of 2,2'-azobisisobutyronitril, and pre-polymerized at 80° C. to obtain a syrup containing 5% by mass of a prepolymer. A monomer syrup was obtained by mixing 80 parts by mass of the prepolymer syrup and 20 parts by mass of MMEPA. After mixing 100 parts by mass of the monomer syrup with 0.08 part by mass of 2,2'-azobisisobutyronitril, 0.01 part by mass of an ultraviolet absorber and 0.05 part by mass of a parting agent, degassing was performed at 650 mmHg (87 kPa) for 30 minutes to obtain a raw material liquid. The raw material liquid was injected into a glass cell comprising two water-repellent glass plates (10 mm in thickness, 30 cm×30 cm) and a gasket made of a vinyl chloride resin, and polymerized in a circulating hot air furnace at 72° C. for 3 hours and then at 120° C. for 1 hour to produce a sheet-like formed article with a thickness of 3.2 mm. A test piece was cut out of the obtained formed article, and evaluations of fire retardancy, transparency and water absorptivity were performed. The obtained sheet-like formed article, which was made of a polymer with a very high molecular weight, did not dissolve in a solvent, and was only swelled. Therefore, the molecular weight could not be measured by GPC. An estimated weight average molecular weight is not less than one million g/mol. The structural unit (mol %) derived from DEMMPO as the phosphonate monomer (1) and the content (% by mass) of phosphorus atoms were computed by $^1$H-NMR measurement in the swelled state. Results are shown in Table 3.

Copolymers of the phosphonate monomers (1) and the radical polymerizable monomers (2) from the Examples have a large production amount of char, and all show fire retardancy (UL94V) of V-0 to V-1, and a glass transition temperature of higher than 100° C.

The copolymer according to the present invention has excellent fire retardancy even in a case where the content of the structural unit derived from the phosphonate monomer (1) is in a lower range. For example, the copolymers from Examples 3 and 4 have excellent fire retardancy although they have a smaller content of the structural unit derived from the phosphonate monomer (1) as compared with the copolymer from Comparative Example 4. Since high fire retardancy can be obtained when methacrylic acid is copolymerized even in a small amount, the used amount of the radical polymerizable monomer (2a) or the radical polymerizable monomer (2c), which are relatively expensive, can relatively be reduced. Therefore, a copolymer having an excellent balance of fire retardancy, transparency and heat resistance can be obtained at low cost (Examples 7 to 11).

As shown in Comparative Example 5, even in the case of a copolymer not according to the present invention, fire retardancy may be improved by increasing the content of the structural unit derived from the phosphonate monomer (1). However, the glass transition temperature thereof will be low, and the water absorptivity thereof will be high. As shown in Comparative Examples 1 to 5, the glass transition temperature of an obtained copolymer tends to decrease, and the water absorptivity thereof tends to increase as the content of the phosphonate monomer (1) is increased.

Further, the copolymer of a phosphate monomer and the radical polymerizable monomer (2) which does not contain the structural unit derived from the phosphonate monomer (1) from Comparative Example 7 has a glass transition temperature of less than 100° C. and inferior fire retardancy even though the copolymerization ratio of the phosphate monomer is 30% by mass.

As shown in Example 9, high fire retardancy and high thermal resistance can be simultaneously achieved by combining the phosphonate monomer (1) and an appropriate amount of methacrylic acid. Further, as shown in Example 11, a copolymer having high fire retardancy can also be obtained when a monomer such as styrene is used as the radical polymerizable monomer (3) other than methyl methacrylate.

As described above, the copolymer according to the present invention has excellent transparency and fire retardancy as well as a high glass transition temperature.

The invention claimed is:

1. A copolymer comprising:
a structural unit (I) derived from a phosphonate monomer (1) represented by formula (1); and
a structural unit (II) derived from at least one radical polymerizable monomer (2) selected from the group consisting of methacrylic acid, acrylic acid, a radical polymerizable monomer represented by formula (2a), a radical polymerizable monomer represented by formula (2b) and a radical polymerizable monomer represented by formula (2c);
wherein:
a content of phosphorus derived from the phosphonate monomer (1) is 2.0 to 6.0% by mass relative to the mass of the copolymer;
the copolymer has a glass transition temperature of 90 to 180° C.;

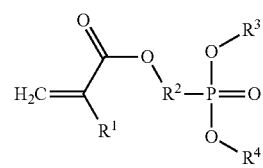

in the formula (1), $R^1$ represents a hydrogen atom or a methyl group; $R^2$ represents an alkylene group having 1 to 4 carbon atoms; and $R^3$ and $R^4$ each independently represent a hydrogen atom or an alkyl group having 1 to 10 carbon atoms;

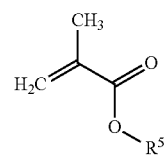

in the formula (2a), $R^5$ represents a polycyclic aliphatic hydrocarbon group or an alkyl substituted monocyclic aliphatic hydrocarbon group;

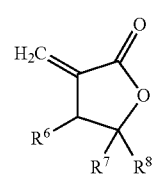

in the formula (2b), $R^6$ and $R^7$ each independently represent a hydrogen atom or an alkyl group having 1 to 10 carbon atoms; and $R^8$ represents an alkyl group having 1 to 10 carbon atoms; and

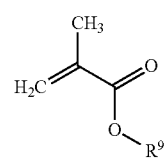

in the formula (2c), $R^9$ represents —$CH_2CHR^{10}R^{11}$, —$CHR^{10}$—$CHR^{11}R^{12}$ or —$CR^{10}R^{11}R^{13}$; and $R^{10}$, $R^{11}$ and $R^{13}$ each independently represent an alkyl group having 1 to 3 carbon atoms; and $R^{12}$ represents a hydrogen atom or an alkyl group having 1 to 3 carbon atoms.

2. The copolymer according to claim 1, comprising 5 to 60% of the structural unit (II) by mass relative to the mass of the copolymer.

3. The copolymer according to claim 1, wherein $R^5$ is selected from the group consisting of a norbornyl group, an isobornyl group, a tricyclodecanyl group, a dicyclopentadienyl group, an adamanthyl group, and a 4-t-butylcyclohexyl group.

4. A formed article comprising the copolymer according to claim 1.

5. The formed article according to claim 4, which is a film or a sheet.

6. A layered product comprising the formed article according to claim 4.

7. The copolymer according to claim 1, further comprising a structural unit (III) derived from a radical polymerizable monomer (3) that is different from the phosphonate monomer (1) and the radical polymerizable monomer (2).

8. The copolymer according to claim 1, wherein a weight average molecular weight of the copolymer is fifty thousand to one million.

9. A copolymer selected from the group consisting of a methyl methacrylate/methacrylic acid/diethyl methacryloyloxymethyl phosphonate copolymer, a methyl methacrylate/methacrylic acid/diethyl 2-methacryloyloxyethyl phosphonate copolymer, a methyl methacrylate/acrylic acid/diethyl methacryloyloxymethyl phosphonate copolymer, a methyl methacrylate/acrylic acid/diethyl 2-methacryloyloxyethyl phosphonate copolymer, a methyl methacrylate/8-tricyclo[5.2.1.0$^{2,6}$]decanyl methacrylate/diethyl methacryloyloxymethyl phosphonate copolymer, a methyl methacrylate/8-tricyclo[5.2.1.0$^{2,6}$]decanyl methacrylate/diethyl 2-methacryloyloxyethyl phosphonate copolymer, a methyl methacrylate/2-isobornyl methacrylate/diethyl methacryloyloxymethyl phosphonate copolymer, a methyl methacrylate/2-isobornyl methacrylate/diethyl 2-methacryloyloxyethyl phosphonate copolymer, a methyl methacrylate/5-methyl-3-methylidynedihydrofuran-2(3H)-one/diethyl methacryloyloxymethyl phosphonate copolymer, a methyl methacrylate/5-methyl-3-methylidynedihydrofuran-2(3H)-one/diethyl 2-methacryloyloxyethyl phosphonate copolymer, a methyl methacrylate/t-butyl methacrylate/diethyl methacryloyloxymethyl phosphonate copolymer, a methyl methacrylate/t-butyl methacrylate/diethyl 2-methacryloyloxyethyl phosphonate copolymer, a styrene/methacrylic acid/diethyl methacryloyloxymethyl phosphonate copolymer, a styrene/methacrylic acid/diethyl 2-methacryloyloxyethyl phosphonate copolymer, a methyl methacrylate/8-tricyclo[5.2.1.0$^{2,6}$]decanyl methacrylate/diethyl 2-methacryloyloxyethyl phosphonate/methyl acrylate copolymer, a methyl methacrylate/8-tricyclo[5.2.1.0$^{2,6}$]decanyl methacrylate/methacrylic acid/diethyl 2-methacryloyloxyethyl phosphonate copolymer, and a methyl methacrylate/8-tricyclo[5.2.1.0$^{2,6}$]decanyl methacrylate/t-butyl methacrylate/diethyl 2-methacryloyloxyethyl phosphonate copolymer;

wherein a content of phosphorus derived from diethyl methacryloyloxymethyl phosphonate monomers or diethyl 2-methacryloyloxyethyl phosphonate monomers is 2.0 to 6.0% by mass relative to the mass of the copolymer.

10. A formed article comprising the copolymer according to claim 9.

11. The formed article according to claim 10, which is a film or a sheet.

12. A layered product comprising the formed article according to claim 10.

13. A copolymer comprising:
a structural unit (I) derived from a phosphonate monomer (1) represented by formula (1); and
a structural unit (II) derived from at least one radical polymerizable monomer (2) selected from the group consisting of methacrylic acid, acrylic acid, a radical polymerizable monomer represented by formula (2a), a radical polymerizable monomer represented by formula (2b) and a radical polymerizable monomer represented by formula (2c);

wherein:
the structural unit (I) is present in an amount of 15 to 28% of by mole relative to a total number of moles of structural units in the copolymer;
a content of phosphorus derived from the phosphonate monomer (1) is 2.0 to 6.0% by mass relative to the mass of the copolymer;

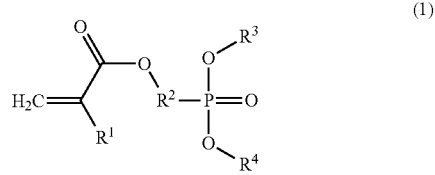

(1)

in the formula (1), $R^1$ represents a hydrogen atom or a methyl group; $R^2$ represents an alkylene group having 1 to 4 carbon atoms; and $R^3$ and $R^4$ each independently represent a hydrogen atom or an alkyl group having 1 to 10 carbon atoms;

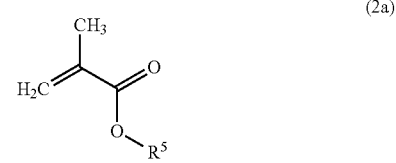

(2a)

in the formula (2a), $R^5$ represents a polycyclic aliphatic hydrocarbon group or an alkyl substituted monocyclic aliphatic hydrocarbon group;

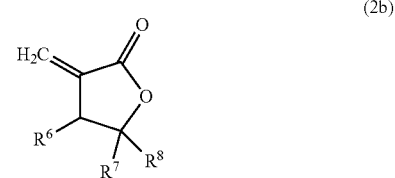

(2b)

in the formula (2b), $R^6$ and $R^7$ each independently represent a hydrogen atom or an alkyl group having 1 to 10 carbon atoms; and $R^8$ represents an alkyl group having 1 to 10 carbon atoms; and

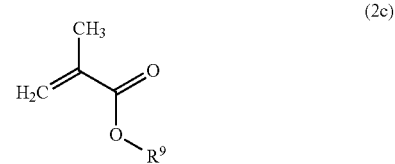

(2c)

in the formula (2c), $R^9$ represents —CH$_2$CHR$^{10}$R$^{11}$, —CHR$^{10}$—CHR$^{11}$R$^{12}$ or —CR$^{10}$R$^{11}$R$^{13}$; and R$^{10}$, R$^{11}$ and R$^{13}$ each independently represent an alkyl group having 1 to 3 carbon atoms; and R$^{12}$ represents a hydrogen atom or an alkyl group having 1 to 3 carbon atoms.

14. A formed article comprising the copolymer according to claim 13.

15. The formed article according to claim 14, which is a film or a sheet.

16. A layered product comprising the formed article according to claim 14.

17. A copolymer comprising:
a structural unit (I) derived from a phosphonate monomer (1) represented by formula (1); and
a structural unit (II) derived from at least one radical polymerizable monomer (2) selected from the group consisting of methacrylic acid, acrylic acid, a radical polymerizable monomer represented by formula (2a), a radical polymerizable monomer represented by formula (2b) and a radical polymerizable monomer represented by formula (2c);
wherein:
a ratio of a weight average molecular weight to number average molecular weight of the copolymer is 1.1 to 10.0;
a content of phosphorus derived from the phosphonate monomer (1) is 2.0 to 6.0% by mass relative to the mass of the copolymer;

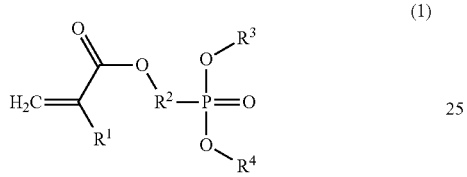
(1)

in the formula (1), $R^1$ represents a hydrogen atom or a methyl group; $R^2$ represents an alkylene group having 1 to 4 carbon atoms; and $R^3$ and $R^4$ each independently represent a hydrogen atom or an alkyl group having 1 to 10 carbon atoms;

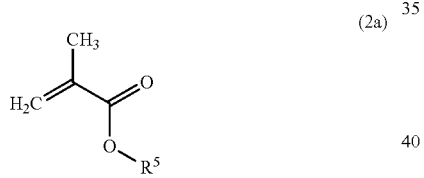
(2a)

in the formula (2a), $R^5$ represents a polycyclic aliphatic hydrocarbon group or an alkyl substituted monocyclic aliphatic hydrocarbon group;

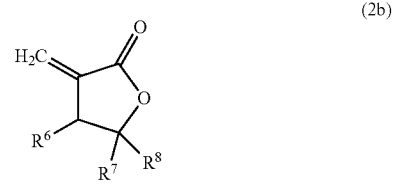
(2b)

in the formula (2b), $R^6$ and $R^7$ each independently represent a hydrogen atom or an alkyl group having 1 to 10 carbon atoms; and $R^8$ represents an alkyl group having 1 to 10 carbon atoms; and

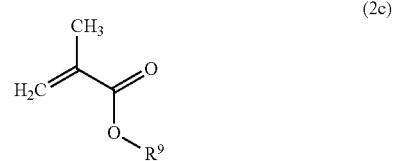
(2c)

in the formula (2c), $R^9$ represents —$CH_2CHR^{10}R^{11}$, —$CHR^{10}$—$CHR^{11}R^{12}$ or —$CR^{10}R^{11}R^{13}$; and $R^{10}$, $R^{11}$ and $R^{13}$ each independently represent an alkyl group having 1 to 3 carbon atoms; and $R^{12}$ represents a hydrogen atom or an alkyl group having 1 to 3 carbon atoms.

18. A formed article comprising the copolymer according to claim 17.

19. The formed article according to claim 18, which is a film or a sheet.

20. A layered product comprising the formed article according to claim 18.

* * * * *